United States Patent
Weldy et al.

(10) Patent No.: US 6,188,804 B1
(45) Date of Patent: Feb. 13, 2001

(54) RECONSTRUCTING MISSING PIXEL INFORMATION TO PROVIDE A FULL OUTPUT IMAGE

(75) Inventors: John A. Weldy, Rochester, NY (US); Jennifer C. Loveridge, North Harrow (GB)

(73) Assignee: Eastman Kodak Company, Rochester, NY (US)

( * ) Notice: Under 35 U.S.C. 154(b), the term of this patent shall be extended for 0 days.

(21) Appl. No.: 09/080,791

(22) Filed: May 18, 1998

(51) Int. Cl.$^7$ .................................................. G06K 9/32
(52) U.S. Cl. .................. 382/300; 382/254; 382/260; 382/265; 382/279
(58) Field of Search .................... 382/300, 254, 382/260, 265, 279

(56) References Cited

U.S. PATENT DOCUMENTS

| | | | |
|---|---|---|---|
| 4,574,311 | 3/1986 | Resnikoff et al. | 348/315 |
| 4,910,694 | * 3/1990 | Walther | 364/581 |
| 5,172,227 | * 12/1992 | Tsai et al. | 358/133 |
| 5,272,536 | * 12/1993 | Sudo et al. | 358/213.15 |
| 5,363,318 | * 11/1994 | McCauley | 364/571.01 |
| 5,812,336 | * 9/1998 | Spurbeck et al. | 360/51 |
| 5,960,106 | * 9/1999 | Tsuchiya et al. | 382/144 |

OTHER PUBLICATIONS

Benedetto and Frazier, Wavelets: Mathematics and Applications, CRC Press, 1994, pp. 336–359.
IEEE Transactions on Image Processing, vol. 6, No. 4, Apr. 1997, 'Computationally Attractive Reconstruction of Band-limited Images from Irregular Samples' by Strohmer.
Pratt, Digital Image Processing, John Wiley & Sons, 1978, pp. 111–120.
Image Processing, by D. Pearson, published by McGraw–Hill (1991), pp. 22 to 26.

\* cited by examiner

Primary Examiner—Bhavesh Mehta
Assistant Examiner—Kanji Patel
(74) Attorney, Agent, or Firm—Raymond L. Owens

(57) ABSTRACT

A method of processing a sampled input image having pixels which can have missing information at pixel locations to reconstruct an output image therefrom, including providing a mask for the sampled image to identify valid pixel locations; interpolating by convolution with at least one finite impulse response (FIR) filter(s) applied to the information at valid pixel locations to produce reconstructed information for non-valid pixel locations; and adaptively normalizing the reconstructed information for the non-valid pixel locations produced by applying the FIR filter(s) to the mask so that the valid pixels and the reconstructed information at non-valid pixel locations provide a reconstructed image.

8 Claims, 1 Drawing Sheet

RECONSTRUCTING MISSING PIXEL INFORMATION TO PROVIDE A FULL OUTPUT IMAGE

FIELD OF THE INVENTION

The present invention relates to image processing, and is more particularly concerned with the processing of sampled images that can have missing information to provide a full output image.

BACKGROUND OF THE INVENTION

There are many imaging and communications systems which employ an image which is not uniformly sampled, and from which a full image is reconstructed. The human visual system provides an example from nature wherein the spatial positions of the rods and cones provide random samples of the scene imaged on the retina, from which a full image is subsequently reconstructed. Another example of a system dealing with two dimensional signals or images is found in video and electronic still applications where charge coupled device (CCD) sensors are often used. CCDs may have defects or non-valid pixels, and thereby have incomplete information at some pixel locations. Additionally, in the case where a single sensor is used to capture multiple two-dimensional channels, for example the color channels of an image, then a color filter array (CFA) is often employed to discriminate between the color channels. The CFA acts as either a regular or random sampling device in each of the color channels and may, in addition have defects which results in additional incomplete information.

There are many situations in which random sampling of a signal has significant advantages over regular sampling, an excellent review of such advantages being provided by U.S. Pat. No. 4,574,311 entitled "Random Array Sensing Devices." Highlighted in the above-mentioned application is the fact that aliasing can occur when a non-bandlimited signal is sampled. Aliasing is particularly noticeable (as low frequency periodic information) when a non-bandlimited high frequency periodic signal is sampled on a regular sampling grid. Aliasing may also occur when a non-bandlimited high frequency signal is randomly sampled, but in this case the artifact is manifest as broad band noise which is less objectionable.

Various approaches to solving the reconstruction problem have been presented. The above-mentioned U.S. Pat. No. 4,574,311 discloses a triangulation based linear interpolation method that utilizes the spatial distance between irregular samples to reconstruct a continuous image: This requires the calculation of multiple distances at each pixel location and limits the contribution to the reconstruction to the nearest neighbour samples.

In many reconstruction schemes, iterative methods are used, such as the Adaptive Weights Method, an iterative Fourier interpolation technique, described in Benedetto and Frazier, Wavelets: Mathematics and Applications, CRC Press, 1994, pp 336–359. A comprehensive review of approaches to reconstructing irregularly sampled images can be found in IEEE Transactions on Image Processing, Vol. 6, No. 4, April 1997, 'Computationally Attractive Reconstruction of Bandlimited Images from Irregular Samples' by Strohmer. Again, recursive or iterative methods are discussed and it is noted that in many cases it is difficult or impossible to extend the methods applicable to one-dimensional signals for use in the reconstruction of signals of two or more dimensions, such as images.

SUMMARY OF THE INVENTION

It is an object of the present invention to provide a full reconstruction from a sampled image which has missing information.

It is another object of the present invention to provide a method of obtaining an output reconstructed image from a sampled input image which overcomes the problems described above, and which avoids computationally expensive iterative or recursive solutions.

A still further object of the invention is to provide a method which is easily extendable to multiple color channel and multiple dimensional signals.

In accordance with one aspect of the present invention, there is provided a method of processing a sampled input image having pixels which can have missing information at pixel locations to reconstruct an output image therefrom, comprising the steps of:

a) providing a mask for the sampled image to identify valid pixel locations;

b) interpolating by convolution with at least one finite impulse response (FIR) filter(s) applied to the information at valid pixel locations to produce reconstructed information for non-valid pixel locations; and c) adaptively normalizing the reconstructed information for the non-valid pixel locations produced by applying the FIR filter(s) to the mask so that the valid pixels and the reconstructed information at non-valid pixel locations provide a reconstructed image.

ADVANTAGEOUS EFFECT OF THE INVENTION

By this method, any sampled signal, can be processed to reconstruct an interpolated output image or signal, which will generally be uniformly or regularly sampled. The method according to the invention is simpler, more robust and more easily implemented than those described in the prior art. In addition, the method is more easily and robustly extendable to two or more dimensions than the methods of the prior art, for use for example, where the signal is multi-dimensional, such as images or time-varying sequences of images.

BRIEF DESCRIPTION OF THE DRAWINGS

For a better understanding of the present invention, reference will now be made, by way of example only, to the accompanying drawings in which.

DETAILED DESCRIPTION OF THE INVENTION

Methods are well known to those skilled in the art range from simple 'sample and hold' techniques, wherein the sample value serves as the continuous reconstructed signal value for the duration of the sampling interval, to more complex interpolation reconstruction schemes such as those disclosed in Pratt, Digital Image Processing, John Wiley & Sons, 1978, pp. 111–120.

Figure 1:
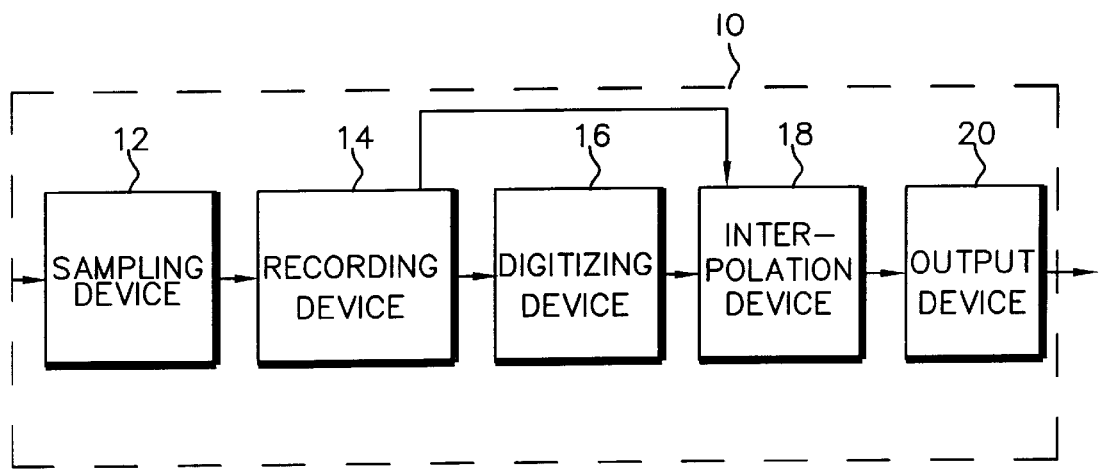
FIGS. 1 and 2 are block diagrams of alternate imaging systems in accordance with the present invention.

In FIG. 1, an imaging system 10 in accordance with the present invention is shown. The system 10 comprises a sampling device 12, recording device 14, an optional digitizing device 16, and interpolation device 18 and an output device 20. The sampling device 12 operates on the scene or image of the scene to provide a series of spaced samples (which can be random, regular, irregular, with wholly or partially missing information at each pixel) of the scene or image of the scene. The recording device 14 captures and records the sampled scene or image of a scene. In the case of a color imaging system, the sampling device 12 may, for example, comprise a color filter array (CFA) in which the colors or the positions of the colors can be random. The recording device, 14, which may include a detector, for example, a sensor, digital camera or photographic film or other arrangement that detects the samples provided by the sampling device 12, and forms a record of those samples. In the case where a digital representation of the sampled image is required, and such a representation is not already provided by the recording device, 14, then a digitizing device 16, for example a scanner, is incorporated into the imaging system, 10. The interpolation device 18 interpolates the samples to produce a full reconstructed representation of the input scene or image of the scene. The interpolation device 18 comprises a either central processing unit or dedicated electronic hardware. Although the interpolation algorithm is embodied in the interpolation device 18, it will be well understood that the algorithm can be stored on a computer program product such as, for example, magnetic storage media, such as magnetic discs (floppy disc) or magnetic tapes; optical storage media such as optical discs, optical tape, or machine readable barcode; solid state devices such as random access memory (RAM) or read only memory (ROM). The output device 20 can display, provide hard-copy of, transmit to another computer or imaging system, or store on some computer storage medium the full reconstructed representation of the input image or image of the scene.

Figure 2:
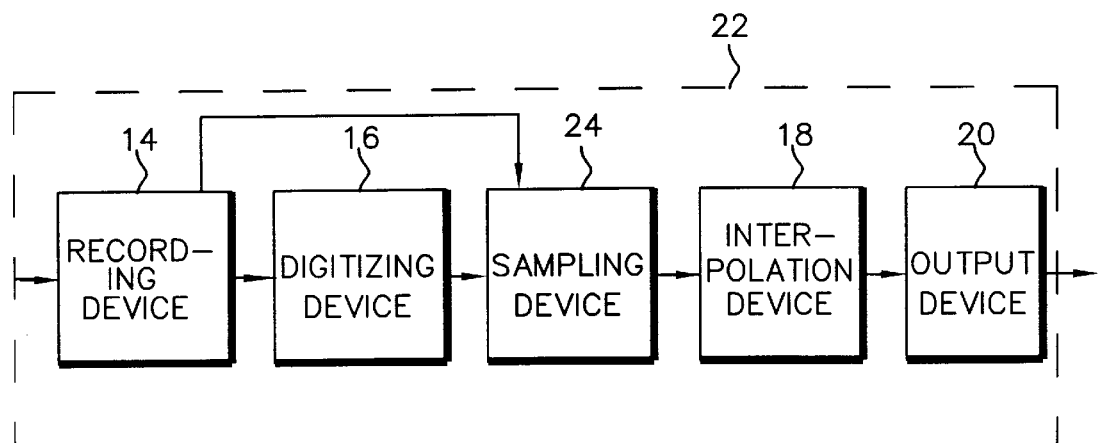

In FIG. 2, an alternate imaging system 22 in accordance with the present invention is shown. The system 22 comprises a recording device 14, an optional digitizing device 16, a sampling device 24, interpolation device 18 and an output device 20. The recording device 14 captures and records the scene or image of a scene and includes a detector, for example, a sensor, digital camera or photographic film. In the case where a digital representation of the signal or image is required, and such a representation is not already provided by the recording device, 14, then a digitizing device 16, for example a scanner, is incorporated into the imaging system, 22. The sampling device 24 randomly, irregularly, or regularly sub-samples the image, and can comprise, for example, a transmission or storage device which produces signal drop-outs. It will be understood that similar drop-out errors may be produced in the signal if some of the sensor sites or the electronics of either the recording device, 14, or the digitizing device, 16, is faulty. Alternatively, the sampling device 24 can include a digital signal processor which implements a signal processing algorithm that creates and detects image samples, or detects pre-existing image samples, that are not valid (incomplete or missing information), for example, the values could correspond to an artifact of the algorithm, or to values that have clipped magnitudes, thereby producing an image which contains known, randomly, or irregularly positioned, non-valid samples. The interpolation device 18 interpolates the valid samples to produce a full reconstructed representation of the input scene or image of the scene. The output device 20 can display, provide hard-copy of, transmit to another computer or imaging system, or store on some computer storage medium the full reconstructed representation of the input image or image of the scene.

The present invention provides a method for implementing adaptive normalization for interpolation of sampled images which have non-valid pixels. Although the method of the invention will be described in detail with reference to a monochrome, digital, two-dimensional image, it will be readily appreciated that the method can easily be adapted or modified to process one dimensional signals or three-dimensional images and/or color images. More generally, the invention is applicable to multi-color channel and to multi-dimensional signals. Furthermore, although the description refers to a sampled image, it will be understood that the method can be applied to any sampled signal, which may be digital or analog. The channels that can be used in accordance with the present invention may encompass multiple spatial frequency bands.

Furthermore, although this description refers to a sampled image which has valid and non-valid pixels, it will be understood that the term "sampled image" includes regularly, irregularly or randomly sampled images. Moreover, although it is believed preferable to have digital image, analog images can also be used in accordance with the present invention. Digital images lend themselves to digital image processing by means of commercially available computing devices such as microprocessors or dedicated digital signal processing hardware.

A method in accordance with the present invention of processing a sampled input image having pixels which can have missing information at pixel locations to reconstruct an output image therefrom, includes a series of steps.

These steps are:
a) providing a binary mask for the sampled image to identify valid pixel location;
b) interpolating by convolution with at least one finite impulse response (FIR) filter(s) applied to the information at valid pixel locations to produce reconstructed information for non-valid pixel locations; and
c) adaptively normalizing the reconstructed information for the non-valid pixel locations produced by applying the FIR filter(s) to the binary mask so that the valid pixels and the reconstructed information at non-valid pixel locations provide a reconstructed image.

More specifically, the method of the present invention is defined in detail as follows:

1. Providing a sampled image. In the specific case of a two-dimensional, digital, monochrome image, the image is scanned to obtain a digital representation, F(i,j), where F is the value at the i,jth pixel location and $0 \leq i \leq p$, $0 \leq j \leq q$, that is, for an array which contains p+1 pixels by q+1 pixels and where at least one of those pixels has non-valid information.

2. Producing a binary mask for the digital representation, according to the position of valid pixel values, that is, according to the positions of the samples. The binary mask, M(i,j)=1 at the location of valid pixels and M(i,j)=0 elsewhere.

3. Performing an interpolation using an FIR filter K(a,b) where $-m/2 \leq a \leq m/2$ and $-n/2 \leq b \leq n/2$. It will be clear to those skilled in the art that the phase characteristics of K(a,b) should be such that the pixels of the output interpolated image G(i,j) are positioned correctly. FIR filtering by digital convolution is described in Image Processing, by D. Pearson, published by McGraw-Hill (1991), pages 22 to 26. It may be desirable, in accordance with the usual practice, to pad the image edges with zeroes, or to wrap or replicate the edge values of F(i,j) to enable the interpolation to extend right to the edges of the image.

The interpolation in accordance with the present invention produces a reconstructed image defined as follows:

$$G(i,j) = \frac{1}{N(i,j)} \sum_{b=-n/2}^{n/2} \sum_{a=-m/2}^{m/2} K(a,b) F(i-a, j-b) M(i-a, j-b)$$

for all G, where G(i,j) is the value of the output reconstructed image at the i,jth pixel position and where N(i,j), the adaptive normalization, is defined as follows:

$$N(i, j) = \sum_{b=-n/2}^{n/2} \sum_{a=-m/2}^{m/2} K(a, b) M(i-a, j-b)$$

It will be understood that should N(i,j)=0, that is in the case where no valid samples are present in the area defined by the FIR filter, G(i,j) will be undefined, and hence the FIR filter K(a,b) should be designed to prevent such an occurrence.

In the above-described this case, n and m are even, that is, the FIR filter has an odd number of coefficients in both dimensions, and a modification is required to the limits on the summations in the case where n and/or m are odd.

Furthermore, in this case, the output reconstructed image G is defined on the same sampling grid as the grid which describes the positions of the samples of the input image F. It will be readily appreciated that this algorithm can be easily adapted for applications where a different sampling grid is required for the output image, that is in the case where the input and output images are of different size or nominal resolution.

In some circumstances it ill be advantageous to employ a set of FIR filters of sizes (m+1, n+1) where m and n are variable, for the purposes of interpolation. At each pixel, or output sampling position, a single FIR filter, is selected from the set of filters such that it is, for example, the filter of smallest spatial size that satisfies the criteria that $$N(i, j) = \sum_{b=-n/2}^{n/2} \sum_{a=-m/2}^{m/2} K(a, b) M(i-a, j-b),$$

the adaptive normalization, is greater than a pre-specified threshold value $V_0$, $0<V_0 \leq 1.0$ (for the case where the K(a,b) is normalised to 1.0). If the filter set contains an FIR filter which has a single central coefficient of value 1.0, all other values being 0.0, (an all-pass filter), then it can be seen that at pixel positions which correspond to the locations of the valid input samples, the all-pass filter will be selected according to the above criteria, and hence the output sample value will exactly correspond to the input sample value. That is, the output image is the same as the input image at all pixel positions where M(i,j)=1, and is interpolated at all other positions.

Alternatively there are a plurality of FIR filters and a given FIR filter is selected for each non-valid pixel location so that each selected FIR filter(s) has the smallest spatial extent to contain within the FIR filter(s) area of application a minimum number of valid samples. This number can be independent of, or, more likely, a function of the number of coefficients in the FIR filter kernel. It will be understood that the set of FIR filters can be generated in advance, or calculated as an integral part of the algorithm. The advantage of employing a set of filters is to enable the interpolation to be tuned to the local statistics of the sampling, and thereby maximising sharpness in areas where the sample density is high whilst minimising interpolation artifacts in areas of low sample density.

In the case where this method is used to digitally interpolate a multicolor channel sampled image, for example the color separations of an image exposed and scanned through a color filter array, steps (1) to (3) above are repeated for each color separation and the binary mask for each separation is obtained.

The above description applies to an image where the positions of the valid samples in one or more color channels can be described by one or more binary masks, that is in the case where samples are either fully present or missing at each sampling position. A more general realization of the technique described above is applicable in the case where the image is sampled in such a way that only partial samples exist at each sampling position. An example of sampling wherein a partial sample exists at each sampling position, occurs when an image of a scene is transmitted through a CFA and recorded onto an analog capturing and recording device, for example photographic film, before digitization. In this example the proportions of light transmitted by the CFA in each band of spectral frequencies or color channel, labelled c, at each pixel position is given by T(i,j,c), and the reconstructed image for that color band G(i,j,c,) is, in accordance with the present invention:

$$G(i, j, c) = \frac{1}{N(i, j, c)} \sum_{b=-n/2}^{n/2} \sum_{a=-m/2}^{m/2} \frac{K(a, b, c) \cdot F(i-a, j-b, c) \cdot M(i-a, j-b, c)}{T(i-a, j-b, c)}$$

where
F(i,j,c) is a sampled image representing color channel c;
M(i,j,c) is a binary mask for color channel c wherein
    M(i,j,c)=1 if T(i,j,c)>$T_0$;
    and M(i,j,c)=0 if T(i,j,c)$\leq T_0$; and
where
$T_0$ is a predefined threshold with a value close to zero;
K(a,b,c) is an FIR filter chosen for color channel c; and
N(i,j,c) is the adaptive normalization which is given by:

$$N(i, j, c) = \sum_{b=-n/2}^{n/2} \sum_{a=-m/2}^{m/2} K(a, b, c) M(i-a, j-b, c)$$

Additionally, $$\frac{K(a, b, c), F(i-a, j-b, c), M(i-a, j-b, c)}{T(i-a, j-b, c)}$$

is defined as being equal to zero when T(i–a, j–b,c)=0.

The FIR filters, K(a,b,c), chosen for the interpolation of each color channel can each have different characteristics, dependent on the statistics of F(i,j,c). It will be understood that for each color channel a set of filters of varying sizes or impulse responses, one of which may be an all-pass filter, can be employed, as described above.

In the example above, the function of the binary mask is to prevent quantization artifacts that result when T(i,j,c)0.0. An alternative, preferred, approach to minimise the significance problems that could result in quantization is to generate the reconstructed output image using $$G(i, j, c) = \frac{\sum_{b=-n/2}^{n/2} \sum_{a=-m/2}^{m/2} F(i-a, j-b, c) \cdot K(a, b, c)}{\sum_{b=-n/2}^{n/2} \sum_{a=-m/2}^{m/2} T(i-a, j-b, c) \cdot K(a, b, c)}$$

where
F(i,j,c) is a sampled image representing color channel c;
K(a,b,c) is an FIR filter chosen for color channel c
T(i,j,c) is a proportion of the valid pixel information in each channel as compared to the total possible valid pixel information in each channel.

Although the method described in the equation above applies to the independent two-dimensional reconstruction of each color channel, c, of G(i,j,c), it will be understood that this method can be extended to take advantage of likely cross-correlation of the color channels of the signal or image before the sampling, by means of a three-dimensional interpolation employing one or more three-dimensional FIR filters.

In the situation where there is a plurality of FIR filters, a given FIR filter can be selected for each non-valid pixel location so that each selected FIR filter(s) has the smallest spatial extent to contain within the FIR filter(s) area of application a minimum number of valid samples.

Furthermore, it will be understood that the method described above can be readily simplified for use in the monochrome case, where T(i,j), $0 \leq T(i,j) \leq 1.0$, is the fraction of the sample present at each (i,j)th sampling position.

Those skilled in the art will appreciate that the method in accordance with the present invention can be provided by algorithms which are stored on a computer readable storage medium. The computer readable storage medium may for example include magnetic storage media such as magnetic disks (i.e., a floppy disk) or magnetic tape, optical storage media such as an optical disk, optical tape, or machine readable memory (RAM), or read-only memory (ROM); or any other physical device or medium employed to store a computer program.

The invention has been described in detail with particular reference to certain preferred embodiments thereof, but it will be understood that variations, modifications, and combinations of the above methods can be effected within the spirit and scope of the invention.

Parts list 10 imaging system
12 sampling device
14 recording device
16 digitizing device
18 interpolation device
20 output device
22 imaging system
24 sampling device

What is claimed is:

1. A method of processing a sampled input image having pixels which can have missing information at pixel locations to reconstruct an output image therefrom, comprising the steps of:

a) providing a mask for the sampled image to identify valid and non-valid pixel locations;

b) interpolating by convolution with at least one finite impulse response (FIR) filter(s) applied to the information at valid pixel locations to produce reconstructed information for non-valid pixel locations; and c) adaptively normalizing the reconstructed information for the non-valid pixel locations produced by applying the FIR filter(s) to the mask so that the valid pixels and the reconstructed information at non-valid pixel locations provide a reconstructed image, wherein the reconstructed image, G(i,j), is defined by:

$$G(i, j) = \frac{1}{N(i, j)} \sum_{b=-n/2}^{n/2} \sum_{a=-m/2}^{m/2} K(a, b) F(i-a, j-b) M(i-a, j-b)$$

where

F(i,j) is the sampled input image;
M(i,j) is a binary mask indicating the location of the image samples, where M(i,j)=1, Otherwise, M(i,j)=0,
K(a,b) is an FIR filter;
N(i,j) is the adaptive normalization which is given by:

$$N(i, j) = \sum_{b=-n/2}^{n/2} \sum_{a=-m/2}^{m/2} K(a, b) M(i-a, j-b); \text{ and}$$

(i,j) labels the sampling positions of the reconstructed image.

2. The method according to claim 1 wherein the reconstructed image G(i,j,c), is defined by:

$$G(i, j, c) = \frac{\sum_{b=-n/2}^{n/2} \sum_{a=-m/2}^{m/2} F(i-a, j-b, c) \cdot K(a, b, c)}{\sum_{b=-n/2}^{n/2} \sum_{a=-m/2}^{m/2} T(i-a, j-b, c) \cdot K(a, b, c)}$$

where

F(i,j,c) is a sampled image representing color channel c;
K(a,b,c) is an FIR filter chosen for color channel c
T(i,jc) is a proportion of the valid pixel information in each channel as compared to the total possible valid pixel information in each channel.

3. The method according to claim 1 wherein the sampled image is one, two, or multi-dimensional.

4. The method according to claim 1 wherein the sampled image has multiple color channels or multiple bands of spatial frequency.

5. The method according to claim 1 wherein the FIR filter is selected from a group of FIR filters wherein the selected FIR filter provides an appropriate interpolation.

6. The method according to claim 1 wherein from the plurality of FIR filters, a given FIR filter is selected for each non-valid pixel location so that N(i,j) is greater than a predefined threshold.

7. The method according to claim 1 wherein from the plurality of FIR filters, a given FIR filter is selected for each non-valid pixel location so that each selected FIR filter(s) has the smallest spatial extent to contain within the FIR filter(s) area of application a minimum number of valid samples.

8. The method according to claim 2 wherein from the plurality of FIR filters, a given FIR filter is selected for each non-valid pixel location so that each selected FIR filter(s) has the smallest spatial extent to contain within the FIR filter(s) area of application a minimum number of valid samples.

* * * * *